UNITED STATES PATENT OFFICE.

JOHN G. GOTTY, OF JACKSONVILLE, FLORIDA, ASSIGNOR TO GOTTY GAS LIGHTING COMPANY, A CORPORATION OF FLORIDA.

PRODUCTION OF SELF-LIGHTING GAS-MANTLES.

1,227,259.     Specification of Letters Patent.     Patented May 22, 1917.

No Drawing.     Application filed August 29, 1916. Serial No. 117,480.

*To all whom it may concern:*

Be it known that I, JOHN G. GOTTY, a citizen of the United States, residing at Jacksonville, in the county of Duval and State of Florida, have invented certain useful Improvements in the Production of Self-Lighting Gas-Mantles, of which the following is a specification.

My invention relates to the production of self-igniting incandescent gas mantles, and more particularly it has relation to an improved catalytic agent and composition to be mixed therewith, for attaching the catalytic agent to the reticulation of the mantle.

The object of my invention is to provide a self-lighting mantle in which the catalytic agent shall be more active and more firmly attached to the skeletonized webbing than has heretofore been the case, and my invention consists in the composition herein described and more particularly stated in the appended claims.

In the manufacture of self lighting mantles at the present time, a paste composed of platinum black and a liquid is applied to the mantle in the form of a pellet and in streaks.

Mostly, the liquid has not the power of dissolving the "dip" with which the mantles are coated, and the result is that after the mantle is burned off, the pellet will break through or fall off.

The improved paste which I employ in carrying out the process as above outlined, consists of platinum black to which has been added small particles of the finest platinum wire, mixed with a dissolvent comprising alcohol, glycerin, dextrose, or some crystal sugar, and water.

By mixing the small particles of platinum wire with the platinum black I materially increase the power of the catalytic agent, and thereby form a self-lighting medium which will be active and durable as long as the mantle lasts.

The dissolvent which I employ will be found to readily carry the catalytic agent in the form of a paste, and will quickly dissolve the "dip" with which the mantle is coated, whether it is formed of collodion, paraffin or other material.

I claim:—

1. A composition of matter for the purpose specified comprising platinum black, particles of metallic platinum, and a dissolvent comprising alcohol, glycerin, and dextrose.

2. A composition of matter for the purpose specified comprising a catalytic agent, and a dissolvent comprising alcohol, glycerin, and dextrose.

In testimony whereof I affix my signature.

JOHN G. GOTTY.